United States Patent
Harkins, Sr.

(10) Patent No.: US 6,205,604 B1
(45) Date of Patent: *Mar. 27, 2001

(54) PRECEMENTED WELT

(75) Inventor: Daniel C. Harkins, Sr., Brockton, MA (US)

(73) Assignee: Rextrude Co., Brockton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,367

(22) Filed: Jan. 30, 1998

(51) Int. Cl.[7] .............. A43B 13/18; A43B 13/32
(52) U.S. Cl. ................... 12/146 W; 12/142 D; 36/17 R; 36/17 PW; 36/19.5
(58) Field of Search .............. 12/142 D, 146 W; 36/17 R, 17 A, 17 PW, 19.5

(56) References Cited

U.S. PATENT DOCUMENTS

| 1,952,329 | * | 3/1934 | McKenna | 12/142 D |
| 2,117,824 | * | 5/1938 | Rogers | 12/146 W |
| 3,824,643 | * | 7/1974 | Decoulos | 12/67 K |
| 4,095,543 | * | 6/1978 | Gassman | 112/417 |
| 4,390,678 | * | 6/1983 | LaBelle et al. | 528/60 |
| 5,608,000 | * | 3/1997 | Duan et al. | 524/591 |
| 5,820,719 | * | 10/1998 | Strickland et al. | 36/19.5 |
| 5,885,679 | * | 3/1999 | Yasue et al. | 428/57 |

* cited by examiner

Primary Examiner—M. D. Patterson
(74) Attorney, Agent, or Firm—Choate, Hall & Stewart

(57) ABSTRACT

A precemented welt for shoe construction, and methods of making such a welt. The welt comprises a body section, and a solid adhesive surface layer which can be activated to form a bond. The adhesive does not activate at typical truck trailer temperatures, so the welt material can be easily shipped. In one embodiment, the adhesive comprises an aromatic polyurethane elastomer, which can be activated by heating the welt to a temperature of at least 225° F. for at least 30 seconds.

16 Claims, 3 Drawing Sheets

PRECEMENTED WELT

FIELD OF THE INVENTION

The invention pertains to an improved welt used in the production of shoes. The welt is precemented with an adhesive that can be activated during the shoe production process.

BACKGROUND OF THE INVENTION

Traditionally, a leather welt has been stitched to a shoe upper, which was in turn attached to the shoe sole, for comfort and longevity of the shoe. Today, with the advent of unit soles, uppers are attached to the sole by cement; to preserve the traditional appearance, a separate welt is attached to the unit sole around the periphery of the upper. This welt may also increase the strength of the bond between the upper and the sole of the shoe, since the welt is cemented on both sides.

The separate welt is most commonly in the form of a vinyl (or other plastic) strip, which is stitched (or cemented) to the upper, and is cemented and/or stitched to the sole. The cement is usually applied in the form of a viscous liquid to the surface of the welt, which is then placed in contact with the sole or with both sole and upper to form a bond.

It has been suggested that manufacturing costs could be reduced by precoating the welt with a solid adhesive, which could be activated to form a bond when in contact with the sole or both the sole and upper. For example, the welt can comprise a layer of a thermoplastic polymer. Such a welt can be placed in contact with the sole (and optionally the upper), and heat can be applied to soften the thermoplastic and cause it to activate and bond with the sole (and upper). This method avoids the use of dangerous aromatics and volatile cements, and reduces the amount of tooling used in shoe manufacture. Thus, it would be expected to be less expensive than the traditional process.

A precoated welt of this type (manufactured by a coextrusion process), was briefly manufactured and sold by Rextrude, Inc., in the early 1980's. This welt was found not to form a sufficiently strong bond with the shoe, however. Further, it was found that coils of precoated welt would sometimes self-adhere during transport, particularly when left for long periods in semitrucks in the hotter regions of the country. An enclosed truck bed can reach temperatures as high as 140° F. in the summer in some parts of the U.S. Because of these problems, precoated welts were abandoned by the industry.

SUMMARY OF THE INVENTION

It is an object of the present invention to provide a precemented welt capable of forming a strong bond with a shoe sole or with both a sole and an upper when placed in contact therewith and subjected to activating conditions. It is a further object to provide such a welt having activating conditions which are unlikely to be attained unintentionally during storage or shipping of the welt material.

As used herein, "activating conditions" are conditions which cause a solid cement material to adhere to other materials with which it is placed in contact. For the thermoplastic cement materials recommended for the preferred embodiments of the invention described below, an activating condition will usually be a condition of high temperature, suitable to cause softening of the thermoplastic material. Other types of activating conditions are also contemplated within the scope of the invention, such as the presence of solvents or resins. The cement material is said to "bind" to the contacting material when it is subjected to activating conditions.

In one aspect, the invention comprises a precemented welt comprising a body member and a surface layer, the surface layer capable of binding when exposed a temperature of at least 225° F. for a time of at least 30 seconds. The surface layer may be an aromatic polyurethane elastomer such as MORTHANE® PA07. The bond formed with typical sole materials by exposing the welt to activating conditions may have a strength of 30 psi (pounds per square inch) or more.
®"MORTHANE" is a registered trademark of Morton International, Inc.

In another aspect, the invention comprises a precemented welt having a body member and a surface layer, where the surface layer comprises an aromatic polyurethane elastomer. The surface layer may be capable of forming a bond with typical sole materials having a strength of 30 psi or more. The surface layer may be selected so that exposing the welt to air at 140° F. does not constitute an activating condition.

In a further aspect, the invention comprises a precemented welt comprising a solid surface layer capable of forming a bond when subjected to activating conditions, where the solid surface layer is capable of forming a bond having a strength of at least 30 psi. The surface layer is selected so that exposing the layer to air at 140° F. does not constitute an activating condition.

In another aspect, the invention comprises a method of making a precemented welt. The method comprises coextrusion of the structural material of the welt with a thermoplastic polymer capable of binding to a contacting material when exposed to activating conditions. The polymer is selected so that exposure to air at 140° F. does not constitute an activating condition. The bond formed by exposing the welt to activating conditions may have a strength of 30 psi or more. The polymer may be selected so that activating conditions include exposing the welt to temperatures of at least 225° F. for a period of at least 30 seconds.

BRIEF DESCRIPTION OF THE DRAWING

The invention is described with reference to the several figures of the drawing, in which, FIG. 1 portrays a welt according to the invention during shoe construction.

DETAILED DESCRIPTION OF PREFERRED EMBODIMENTS

The present invention comprises methods for producing a polymeric welt, which comprises a substantially inert body and an activatable solid adhesive coating. Some preferred materials for the body of the welt are poly(ethylene-vinyl acetate) copolymers (EVA), poly(vinyl chloride) (PVC), polyurethanes, and thermoplastic rubbers, but any material which is not adversely affected by the activating conditions of the solid adhesive, which is capable of being coextruded or otherwise coated with the adhesive, and which is strong enough to carry out the functions of a normal shoe welt, may be used in the practice of the invention.

Any thermoplastic polymer which has a sufficiently high activating temperature to avoid accidental activation during shipping, and which is capable of forming a strong bond with the welt material, may be used as the solid adhesive portion of the welt. In particular, it has been found that a polycaprolactone-based aromatic polyurethane elastomer produced by Morton International, Inc., whose trade name is MORTHANEX® PA07, has a suitably high activation temperature and strength.

Figure 1:
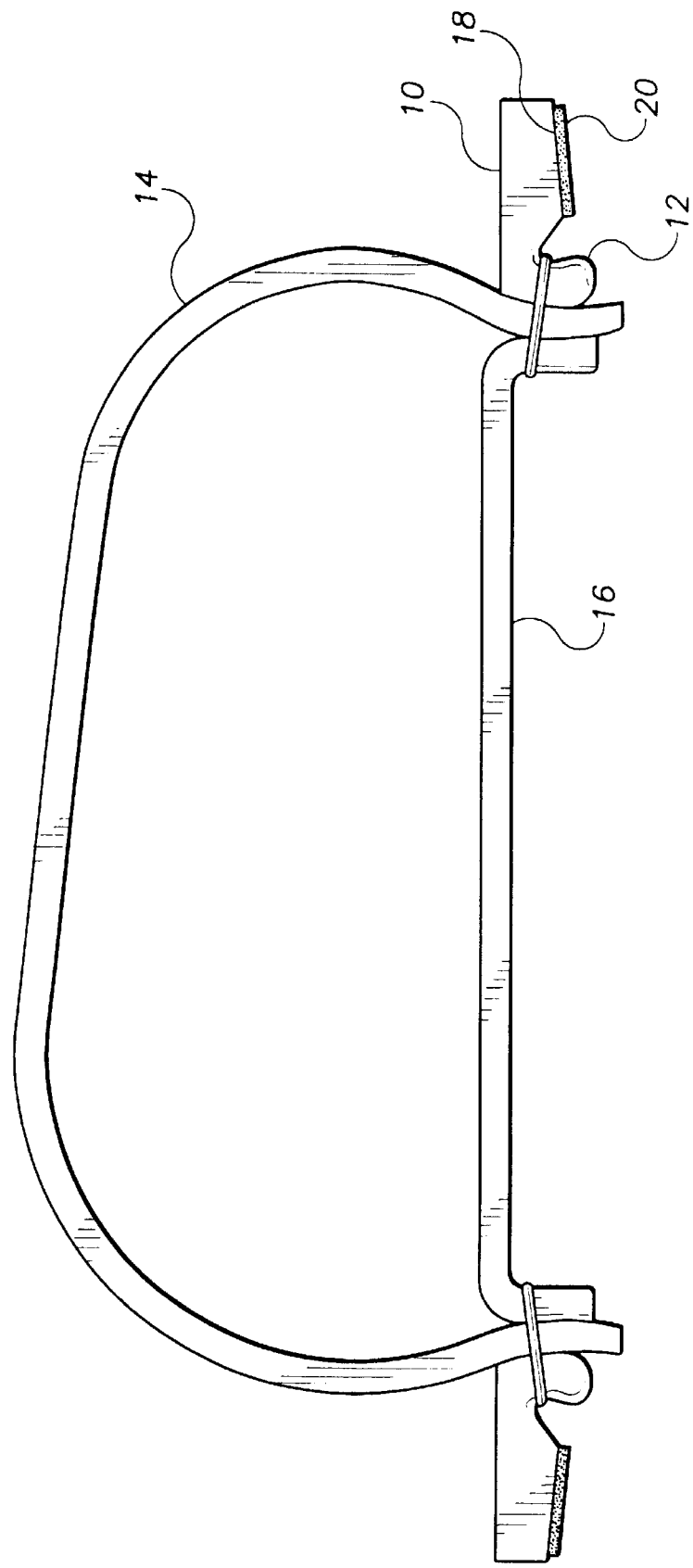

A particular cross-sectional shape for a welt 10 can be seen in FIG. 1, which portrays a welt according to the invention during shoe construction. This welt 10 comprises a hinge and stitch groove 12 which can be stitched to the upper 14 and the inseam rib 16, and an extension 18 with the solid adhesive layer 20 thereon. The solid adhesive layer 20 can be bound to the sole material (not shown) by pressing the two together, and subjecting them to activating conditions for the adhesive layer.

Figure 2:
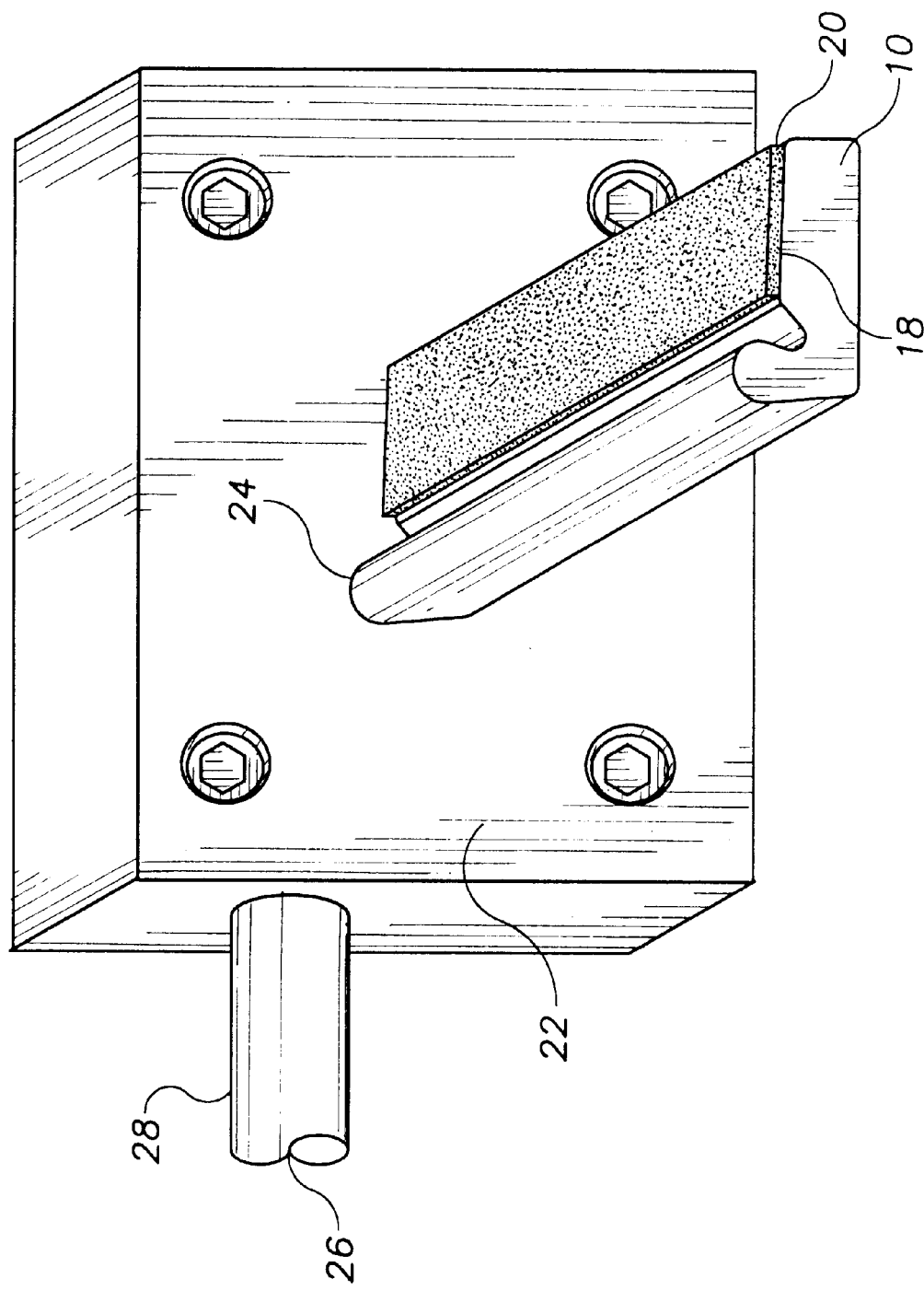
FIG. 2 portrays a typical coextrusion apparatus which can be used for producing a welt acconding to the invention.

The welt of the invention can be manufactured by coextrusion, the techniques of which are well-known in the art of plastic forming. A typical apparatus for producing such a welt is shown in FIG. 2. A shaped welt 10 is passed through a die 22 having an aperture 24 in the desired welt cross-sectional shape. The raw adhesive material 26 is fed into the coextrusion die 22 through a nozzle 28, which applies it to the extension 18 of the welt to form a solid layer 20, which is then cooled. The finished welt material can then be coiled for storage or shipment, and fed from the coil into a mechanical shoemaking apparatus, and is subsequently ready for the application of activating conditions to the welt to bind it to the sole.

Figure 3:
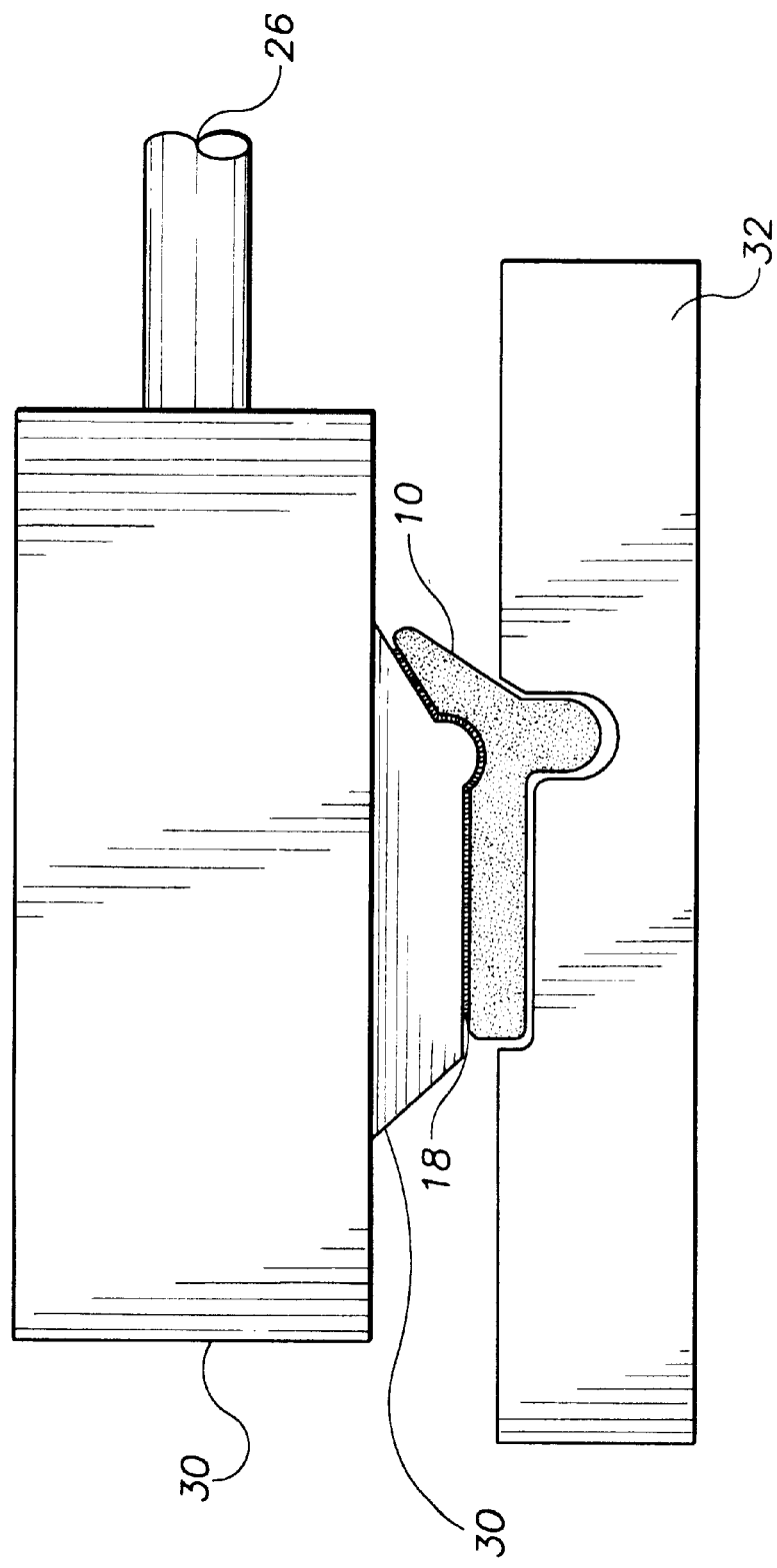
FIG. 3 portrays a method of applying an adhesive layer to a welt by spreading it with a shaped nozzle.

Another method of applying solid adhesive to a welt is by spreading it on the welt surface by means of a shaped nozzle 30, as shown in FIG. 3. In the embodiment shown in FIG. 3, the extruded welt 10 is held in a grooved holder 32, whereby a shaped nozzle 30 applies heated adhesive 26 to the extension 18. Practitioners skilled in the art of plastic forming will recognize that the adhesive should be heated to a high enough temperature to soften it to a convenient viscosity for spreading with the shaped nozzle, but not such a high temperature that the adhesive decomposes. Upon cooling, the solid adhesive layer 20 is formed. The welt can then be coiled as described above.

The preferred method of using the welt of the present invention in shoe construction is to hold the adhesive area of the welt firmly against the shoe midsole and/or sole (or upper, if the welt is to be cemented to the upper), and heating the welt above the activating temperature for a time sufficient for a bond to be formed. When bonding MORTHANE® PA07, it has been found that holding the welt at a temperature of 225° F. for 30 seconds is sufficient to form a strong bond (in excess of 30 psi). It will be recognized by skilled practitioners that activation may occur at lower temperatures when the welt is held for longer time periods.

The welt may also be activated, for example, by the use of solvents. In one such embodiment, a solvent suitable to soften the solid adhesive may be sprayed or otherwise applied to the adhesive surface, and then the welt can be pressed against the midsole and/or sole as described above until the bond has formed.

Other embodiments of the invention will be apparent to those skilled in the art from a consideration of the specification or practice of the invention disclosed herein. It is intended that the specification be considered as exemplary only, with the true scope and spirit of the invention being indicated by the following claims.

What is claimed is:

1. A precemented welt, comprising
   a body member; and
   an inactive solid surface layer attached to the body member, comprising an aromatic polyurethane elastomer,
   wherein the solid surface layer and the body member are attached without an organic solvent.

2. The precemented welt of claim 1, wherein the solid surface layer is further characterized in that, when activated, it constitutes an adhesive that will attach the body member to any shoe part comprised of a material selected from the group consisting of EVA, PVC, polyurethanes, and thermoplastic rubbers to form a bond having a strength of at least 30 psi at room temperature.

3. The precemented welt of claim 1, where the material comprising the solid surface layer is selected so that exposing the solid surface layer to air at a temperature less than or equal to 140° F. does not constitute an activating condition for the layer.

4. A precemented welt for attachment to a shoe, comprising a body member; and
   an inactive solid surface layer attached to the body member,
   wherein the solid surface layer is characterized in that it becomes activated when exposed to a temperature of at least 225° F. for a period of approximately 30 seconds, but not when exposed to air at a temperature less than or equal to 140° F., and, when activated, constitutes an adhesive with sufficient strength to attach the body member to an adjacent material, and
   wherein, the inactive solid surface layer comprises an extruded thermoplastic polymer.

5. The precemented welt of claim 1, where the solid surface layer comprises an aromatic polyurethane elastomer.

6. The precemented welt of claim 1, wherein the solid surface layer is further characterized in that, when activated, it constitutes an adhesive that will attach the body member to any shoe part comprised of a material selected from the group consisting of EVA, PVC, polyurethanes, and thermoplastic rubbers to form a bond having a strength of at least 30 psi at room temperature.

7. A precemented welt, comprising a body member and an inactive solid surface layer attached to the body member, wherein:
   the solid surface layer comprises an extruded aromatic polyurethane elastomer,
   the solid surface layer is not activated by exposure to air at a temperature less than or equal to 140° F.

8. A method of producing a precemented welt for a shoe, comprising;
   coextruding an aromatic polyurethane elastomer with a body member material to form a welt comprising an inactive solid surface layer attached to a body member.

9. The precemented welt of claim 7, wherein the body member comprises a member of EVA, PVC, polyurethanes, and thermoplastic rubbers.

10. The method of claim 8, wherein the body member comprises a member of EVA, PVC, polyurethanes, and thermoplastic rubbers.

11. The method of claim 8, wherein the thermoplastic polymer is characterized in that, when activated, it constitutes an adhesive that will attach the body member to a shoe component selected from sole, midsole, and upper to form a bond having a strength of at least 30 psi.

12. The method of claim 8, wherein the thermoplastic polymer is further characterized in that it becomes activated when exposed to a temperature of at least 225° F. for at least 30 seconds.

13. A method of attaching a welt to a shoe, comprising
   providing a precemented welt, comprising;
   a body member, a solid surface cement layer attached to the body member, having the following properties:

exposure of the solid surface cement layer to air at a temperature less than or equal to 140° F. does not constitute an activating condition for the layer, and the cement layer is in an inactivated state before attachment of the welt to a portion of the shoe, positioning the welt against the sole of the shoe, exposing the welt to a temperature of at least 225° F. for at least 30 seconds, to form a bond between the welt and the shoe having a strength of at least 30 psi.

14. The method of claim 13, further comprising positioning the welt against the upper of the shoe before exposing the welt.

15. A method of attaching a welt to a shoe, comprising providing a precemented welt, comprising a body member, a solid surface cement layer attached to the body member, wherein exposing the solid surface cement layer to air at a temperature less than or equal to 140° F. does not constitute an activating condition for the layer, positioning the welt against a sole of the shoe, and exposing the welt to a temperature of approximately 225° F. for approximately 30 seconds, to form a bond between the welt and the shoe having a strength of at least 30 psi.

16. The method of claim 13, further comprising attaching the welt to an upper of the shoe before exposing the welt.

* * * * *